(12) United States Patent
Tzou et al.

(10) Patent No.: US 11,431,534 B2
(45) Date of Patent: Aug. 30, 2022

(54) CIRCUIT AND METHOD FOR COMPENSATING FREQUENCY OFFSET IN WIRELESS FREQUENCY SHIFT KEYING COMMUNICATION

(71) Applicant: HANGZHOU VANGO TECHNOLOGIES, INC., Hangzhou (CN)

(72) Inventors: Ching-Kae Tzou, Hangzhou (CN); Cheng-Shing Wu, Hangzhou (CN)

(73) Assignee: HANGZHOU VANGO TECHNOLOGIES, INC., Hangzhou (CN)

( * ) Notice: Subject to any disclaimer, the term of this patent is extended or adjusted under 35 U.S.C. 154(b) by 0 days.

(21) Appl. No.: 17/527,058

(22) Filed: Nov. 15, 2021

(65) Prior Publication Data
US 2022/0078056 A1    Mar. 10, 2022

(30) Foreign Application Priority Data
Sep. 6, 2021 (CN) .......................... 202111038938.9

(51) Int. Cl.
*H04L 27/148* (2006.01)
(52) U.S. Cl.
CPC ................................. *H04L 27/148* (2013.01)
(58) Field of Classification Search
CPC ....... H04L 27/10; H04L 27/14; H04L 27/142; H04L 27/144; H04L 27/148; H04L 27/152; H04L 27/1563; H04L 27/1566
See application file for complete search history.

(56) References Cited

U.S. PATENT DOCUMENTS

| 11,082,270 B1* | 8/2021 | Wu ........................... H04L 1/20 |
| 2003/0002600 A1* | 1/2003 | Twu ..................... H04L 27/2334 |
| | | 375/334 |
| 2007/0046813 A1* | 3/2007 | Lin ...................... H04L 27/0014 |
| | | 348/528 |

(Continued)

OTHER PUBLICATIONS

The Institute of Electrical and Electronics Engineers, Inc., "802.15. 4g-2012—IEEE Standard for Local and metropolitan area networks—Part 15.4: Low-Rate Wireless Personal Area Networks (LR-WPANs) Amendment 3: Physical Layer (PHY) Specifications for Low-Data-Rate, Wireless, Smart Metering Utility Networks," Apr. 2012, pp. 1-252.

*Primary Examiner* — Freshteh N Aghdam
(74) *Attorney, Agent, or Firm* — JCIP Global Inc.

(57) ABSTRACT

Disclosed are a circuit and method for compensating frequency offset in wireless frequency shift keying communication, and belongs to the field of wireless communication technologies. The circuit includes an analog-to-digital converter, a first decimating module, a digital down-converter, a second decimating module, a frequency offset estimator, a frequency shift keying demodulator, a timing recovery module, a synchronization header detector, a frequency recovery module, a numerical-control oscillator, and a differential decoding and symbol decision module. A rough frequency offset estimation value is combined with a slicer error to generate a control signal related to frequency offset in a received signal, and the control signal is transmitted to the numerical-control oscillator to adaptively adjust a center frequency of an oscillated signal.

10 Claims, 5 Drawing Sheets

(56) References Cited

U.S. PATENT DOCUMENTS

| | | | |
|---|---|---|---|
| 2008/0061870 A1* | 3/2008 | Tingwu | H04L 27/2275 |
| | | | 329/304 |
| 2019/0081834 A1* | 3/2019 | de Ruijter | H04W 56/001 |
| 2021/0242894 A1* | 8/2021 | de Ruijter | H04B 1/1638 |

* cited by examiner

CIRCUIT AND METHOD FOR COMPENSATING FREQUENCY OFFSET IN WIRELESS FREQUENCY SHIFT KEYING COMMUNICATION

CROSS-REFERENCE TO RELATED APPLICATION

This application claims the priority benefit of China application serial no. 202111038938.9, filed on Sep. 6, 2021. The entirety of the above-mentioned patent application is hereby incorporated by reference herein and made a part of this specification.

TECHNICAL FIELD

The present invention relates to the field of wireless communication technologies, and more particularly, to a circuit and method for compensating frequency offset in wireless frequency shift keying communication.

BACKGROUND

In a wireless Frequency Shift Keying (FSK) communication system, a center frequency of a signal transmitting channel at a transmitting end and a center frequency of a signal receiving channel have to be exactly the same to obtain optimum performances. However, in a practically applied communication system, due to the abnormality caused by a crystal difference between a transmitter and a receiver, center frequencies at two ends may be different, resulting in a communication fault.

For example, when a low-cost crystal oscillator is used in a pair of transmitter and receiver, a frequency of an oscillated signal provided by the crystal oscillator may be changed around ±25 ppm. When a frequency of a received 928 MHz input radio-frequency signal is converted into an intermediate-frequency or baseband signal by a mixer unit of the receiver, the maximum signal frequency offset (relative to a corresponding transmitter station) caused by the crystal difference of the local oscillators is about +46.4 kHz.

On the other hand, in a typical IoT application, in order to improve the sensitivity of the receiver and extend a long communication distance between a pair of transmitter and corresponding receiver, a user may prefer to use a lower data rate in a frequency shift keying communication system, for example, about 10 kbps (i.e., 10 k bit/s), and remove an out-of-band noise of the signal through accurate filtering, thus improving a Signal-to-Noise Ratio (SNR). However, due to the frequency offset caused by the local oscillators, the frequency of the received signal is likely to fall outside a frequency passband of a narrowband filter. In this case, after the received signal enters a data demodulating unit, data cannot be successfully extracted. If data demodulation is expected to be performed after narrowband accurate filtering, a frequency offset error in a radio signal must be corrected before the narrowband accurate filtering.

Therefore, especially for a low data rate application, a frequency shift keying receiver is required to be capable of adaptively or accurately adjusting a center frequency of a reference signal from the local oscillator, thus reducing the frequency offset in the received signal to the lowest level, so as to perform accurate filtering in digital baseband signal processing, and realize high-sensitivity signal reception and demodulation.

Reference 1: IEEE std. 802.15.4g-2012, *Amendment 3: Physical Layer (PHY) Specifications for Low-Data-Rate, Wireless, Smart Metering Utility Networks*, Apr. 27, 2012.

SUMMARY

Objective of the invention: a technical problem to be solved by the present invention is to provide a circuit and method for compensating frequency offset in wireless frequency shift keying communication aiming at the defects in the prior art.

In order to solve the above technical problem, in a first aspect, a circuit for compensating frequency offset in wireless frequency shift keying communication is disclosed, which includes an analog-to-digital converter, a first decimating module, a digital down-converter, a second decimating module, a frequency offset estimator, a frequency shift keying demodulator, a timing recovery module, a synchronization header detector, a frequency recovery module, a numerical-control oscillator, and a differential decoding and symbol decision module.

The analog-to-digital converter is configured for receiving a frequency shift keying signal and converting the same into a digital signal.

The first decimating module is configured for filtering and decimating the digital signal to obtain a first decimated signal.

The digital down-converter is configured for combining the first decimated signal with an output signal of the numerical-control oscillator, and converting the signal into a complex baseband signal.

The second decimating module is configured for filtering and decimating the complex baseband signal to obtain a second decimated signal; and the second decimating module is formed by cascading more than one decimation filter.

The frequency offset estimator is configured for processing a signal at a rate higher than a sampling rate outputted by the second decimating module to obtain a rough frequency offset estimation value, wherein the signal is the complex baseband signal or a signal outputted by a decimation filter before the last decimation filter of the second decimating module.

The frequency shift keying demodulator is configured for demodulating the second decimated signal to obtain a first demodulated signal and a corresponding slicer error.

The timing recovery module is configured for extracting timing information from the first demodulated signal.

The synchronization header detector is configured for detecting a synchronization header from the first demodulated signal.

The frequency recovery module is configured for, according to the rough frequency offset estimation value, the slicer error and the synchronization header, obtaining a frequency adjustment value.

The numerical-control oscillator is configured for generating a reference signal and using the frequency adjustment value for adjusting a center frequency of the reference signal.

The differential decoding and symbol decision module performs differential decoding and symbol decision on the first demodulated signal, and obtains a final signal in combination with the synchronization header.

With reference to the first aspect, in an implementation, the frequency recovery module includes a first loop filter and a second loop filter, and the first loop filter is connected with the frequency offset estimator to receive the rough frequency offset estimation value; at an initial stage when the first decimated signal is received, an output of the first loop filter is configured for correcting rough frequency offset, and the output is kept to be fixed immediately after the synchronization header is detected; and loop parameters of the first loop filter are recorded as $(k_{p1}, k_{i1})$.

the second loop filter is connected with the frequency shift keying demodulator to receive the slicer error; when the synchronization header is detected, the second loop filter is enabled, and an output of the second loop filter is combined with the output of the first loop filter for correcting residual frequency offset; and loop parameters of the second loop filter are recorded as $(k_{p2}, k_{i2})$.

With reference to the first aspect, in an implementation, the frequency offset estimator includes a second frequency discriminator and a direct current value estimator, and an input of the second frequency discriminator is the complex baseband signal or the signal output by the decimation filter before the last decimation filter of the second decimating module; the second frequency discriminator is connected with the direct current value estimator; and the direct current value estimator outputs the rough frequency offset estimation value and is connected with the frequency recovery module.

Frequency offset information in the received signal is extracted through the frequency offset estimator before the second decimating module or before the last decimation filter of the second decimating module, which greatly increases a frequency offset acquisition range.

With reference to the first aspect, in an implementation, the frequency shift keying demodulator includes a first frequency discriminator and a slicer, and the first frequency discriminator is respectively connected with the second decimating module and the slicer; and the slicer sample-and-holds an output of the first frequency discriminator and outputs a slicer error, and the slicer is respectively connected with the frequency recovery module and the differential decoding and symbol decision module.

With reference to the first aspect, in an implementation, the first decimating module is a first cascaded integrator-comb filter, with a decimation factor of $D_{CIC1}$, and $D_{CIC1} \in \{4, 5, \ldots, 16\}$.

With reference to the first aspect, in an implementation, the second decimating module includes a second cascaded integrator-comb filter, a cascaded integrator-comb compensation filter and a finite impulse response filter, the second cascaded integrator-comb filter, the cascaded integrator-comb compensation filter and the finite impulse response filter are connected in sequence, the second cascaded integrator-comb filter is connected with the digital down-converter, with a decimation factor of $D_{CIC2}$; a decimation factor of the cascaded integrator-comb compensation filter is $D_{Comp}$; the finite impulse response filter is connected with the frequency shift keying demodulator, with a decimation factor of $D_{FIR}$, wherein $D_{CIC2} \in \{2, 3, \ldots, 32\}$, $D_{Comp} \in \{1, 2\}$, and $D_{FIR} \in \{1, 2\}$.

With reference to the first aspect, in an implementation, the first frequency discriminator and the second frequency discriminator have a same structure and both include a Cartesian-polar coordinate converter and a phase differentiator, the Cartesian-polar coordinate converter is connected with the phase differentiator in series, and the Cartesian-polar coordinate converter calculates phase information contained in a complex signal at an input position of the phase differentiator; and then, the phase differentiator performs a differential operation on the phase information, which means to calculate a phase difference between two adjacent phase samples, and obtains an instantaneous frequency in the complex signal at the input position.

With reference to the first aspect, in an implementation, the digital down-converter in which a coordinate rotation digital computer algorithm is employed accumulates the center frequency of the reference signal generated by the numerical-control oscillator plus the frequency adjustment value sent from the frequency recovery module for a period of time to obtain a corresponding angle value, and rotates the first decimated signal at an input port of the digital down-converter by the angle.

With reference to the first aspect, in an implementation, the loop parameters $(k_{p1}, k_{i1})$ of the first loop filter and the loop parameters $(k_{p2}, k_{i2})$ of the second loop filter are capable of being configured according to a frequency offset compensation convergence speed during the frequency offset compensation process, thus adjusting a bandwidth of the loop filter.

In a second aspect, a method for compensating frequency offset in wireless frequency shift keying communication is disclosed, which includes receiving a frequency shift keying signal and converting the same into a digital signal;

filtering and decimating the digital signal to obtain a first decimated signal;

combining the first decimated signal with an output signal of a numerical-control oscillator, and converting the signal into a complex baseband signal;

filtering and decimating the complex baseband signal to obtain a second decimated signal; wherein a second decimating module is formed by cascading more than one decimation filter;

processing the complex baseband signal or a signal outputted by a decimation filter before the last decimation filter of the second decimating module at a rate higher than a sampling rate outputted by the second decimating module to obtain a rough frequency estimation value;

demodulating the second decimated signal to obtain a first demodulated signal, and generating, by a corresponding slicer, a slicer error corresponding to the first demodulated signal;

according to the rough frequency offset estimation value, the slicer error and a synchronization header, obtaining a frequency adjustment value for compensating frequency offset in a received signal;

at an initial stage of receiving the received signal, based on the rough frequency offset estimation value, correcting the frequency offset in the received signal, and when the synchronization header is detected, keeping a frequency offset estimator fixed; and thereafter, based on the slicer error and an output value of the frequency offset estimator kept fixed, correcting residual frequency offset in the received signal; and performing differential decoding and symbol decision on the first demodulated signal, and obtaining a final signal in combination with the synchronization header.

Beneficial effects: the present application is very useful for the frequency shift keying communication (or similar modulation solutions) of low data rate application, especially when the common low-cost crystal oscillator is considered to achieve a reasonable system cost. The frequency offset estimator and compensator proposed in the present application allows a large frequency offset in the received signal and can correct the frequency offset, and meanwhile, since the second decimating module is capable of accurate filtering, a high sensitivity of the frequency shift keying receiver and a good signal-to-noise ratio performance of the output port of the demodulator can be displayed and kept.

Compared with the prior art, the present invention significantly expands the frequency offset acquisition range without affecting the system performance and cost.

BRIEF DESCRIPTION OF THE DRAWINGS

The present invention is further described in detail with reference to the accompanying drawings and the specific embodiments, and the advantages of the above and/or other aspects of the present invention will become clearer.

DETAILED DESCRIPTION

The embodiments of the present invention are described hereinafter with reference to the accompanying drawings.

The embodiments of the present invention disclose a circuit and method for compensating frequency offset in wireless frequency shift keying communication, which may be applied to Smart Metering Utility Networks (SUN). In order to improve a sensitivity of a receiver in long-distance communication between a transmitter and a corresponding receiver, in a communication system based on frequency shift keying, a user may prefer to a scene where low data rate communication is used.

Figure 6:
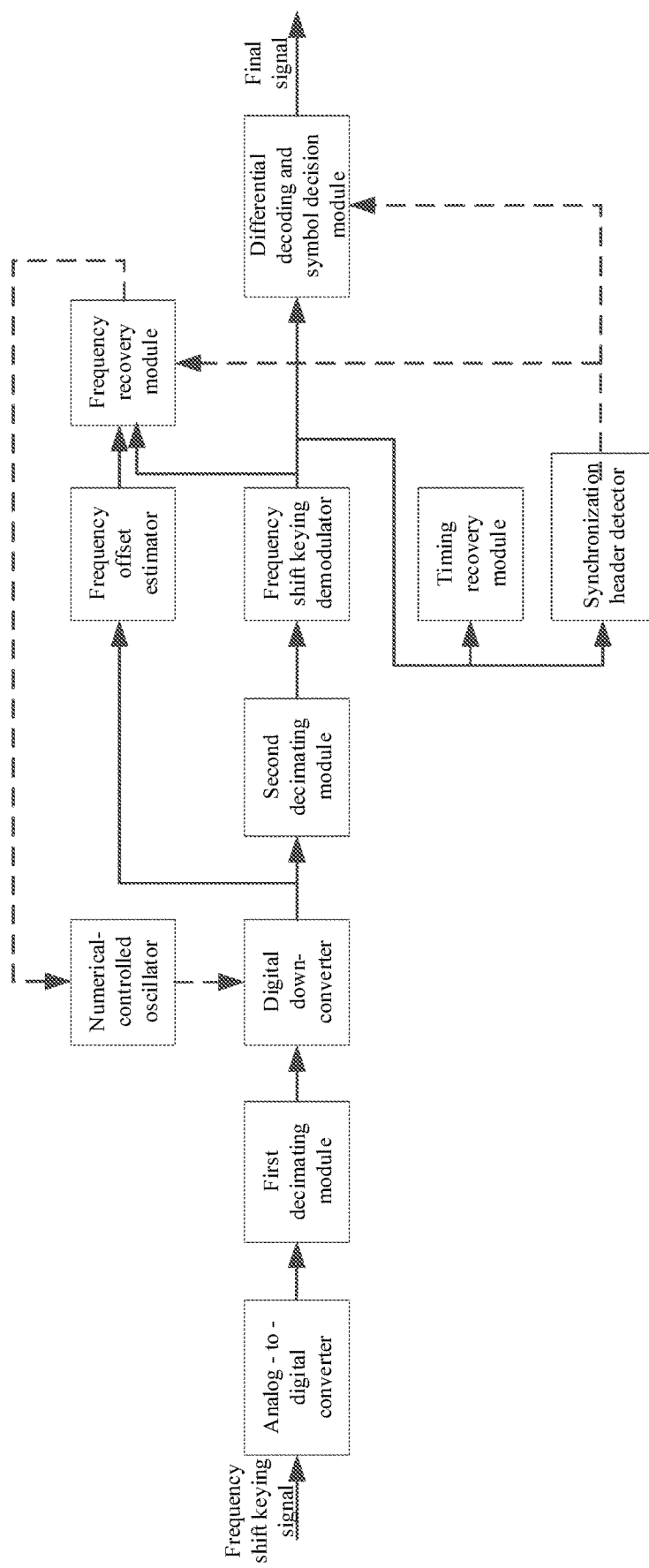
FIG. 6 is a simplified schematic diagram of the circuit for compensating frequency offset in wireless frequency shift keying communication provided by the embodiment of the present application.

A first embodiment of the present application discloses a circuit for compensating frequency offset in wireless frequency shift keying communication, as shown in FIG. 6, which includes an analog-to-digital converter, a first decimating module, a digital down-converter, a second decimating module, a frequency offset estimator, a frequency shift keying demodulator, a timing recovery module, a synchronization header detector, a frequency recovery module, a numerical-control oscillator, and a differential decoding and symbol decision module.

The analog-to-digital converter is configured for receiving a frequency shift keying signal and converting the same into a digital signal.

The first decimating module is configured for filtering and decimating the digital signal to obtain a first decimated signal.

The digital down-converter is configured for combining the first decimated signal with an output signal of the numerical-control oscillator, and converting the signal into a complex baseband signal.

The second decimating module is configured for filtering and decimating the complex baseband signal to obtain a second decimated signal; and the second decimating module is formed by cascading more than one decimation filter.

The frequency offset estimator is configured for processing a signal sample at a rate higher than a sampling rate outputted by the second decimating module to obtain a rough frequency offset estimation value, wherein the signal is the complex baseband signal or a signal outputted by a decimation filter before the last decimation filter of the second decimating module.

The frequency shift keying demodulator is configured for demodulating the second decimated signal to obtain a first demodulated signal and a corresponding slicer error.

The timing recovery module is configured for extracting timing information from the first demodulated signal.

The synchronization header detector is configured for detecting a synchronization header from the first demodulated signal. The synchronization header includes a preamble field and a Start-of-Frame Delimiter (SFD).

The frequency recovery module is configured for, according to the rough frequency offset estimation value, the slicer error and the synchronization header, obtaining a frequency adjustment value.

The numerical-control oscillator is configured for generating a reference signal and using the frequency adjustment value for adjusting a center frequency of the reference signal.

The differential decoding and symbol decision module performs differential decoding and symbol decision on the first demodulated signal, and obtains a final signal in combination with the synchronization header. The final signal is a PHY header (PHR) and a Packet Service Data Unit (PSDU) in Table 1.

In the first embodiment, the frequency recovery module includes a first loop filter and a second loop filter.

The first loop filter is connected with the frequency offset estimator to receive the rough frequency offset estimation value. At an initial stage when the first decimated signal is received, an output of the first loop filter is configured for correcting rough frequency offset, and the output is kept to be fixed immediately after the synchronization header is detected. The loop parameters of the first loop filter are recorded as $(k_{p1}, k_{i1})$.

the second loop filter is connected with the frequency shift keying demodulator to receive the slicer error; when the synchronization header is detected, the second loop filter is enabled, and an output of the second loop filter is combined with the output of the first loop filter for correcting residual frequency offset; and loop parameters of the second loop filter are recorded as $(k_{p2}, k_{i2})$.

Figure 4:
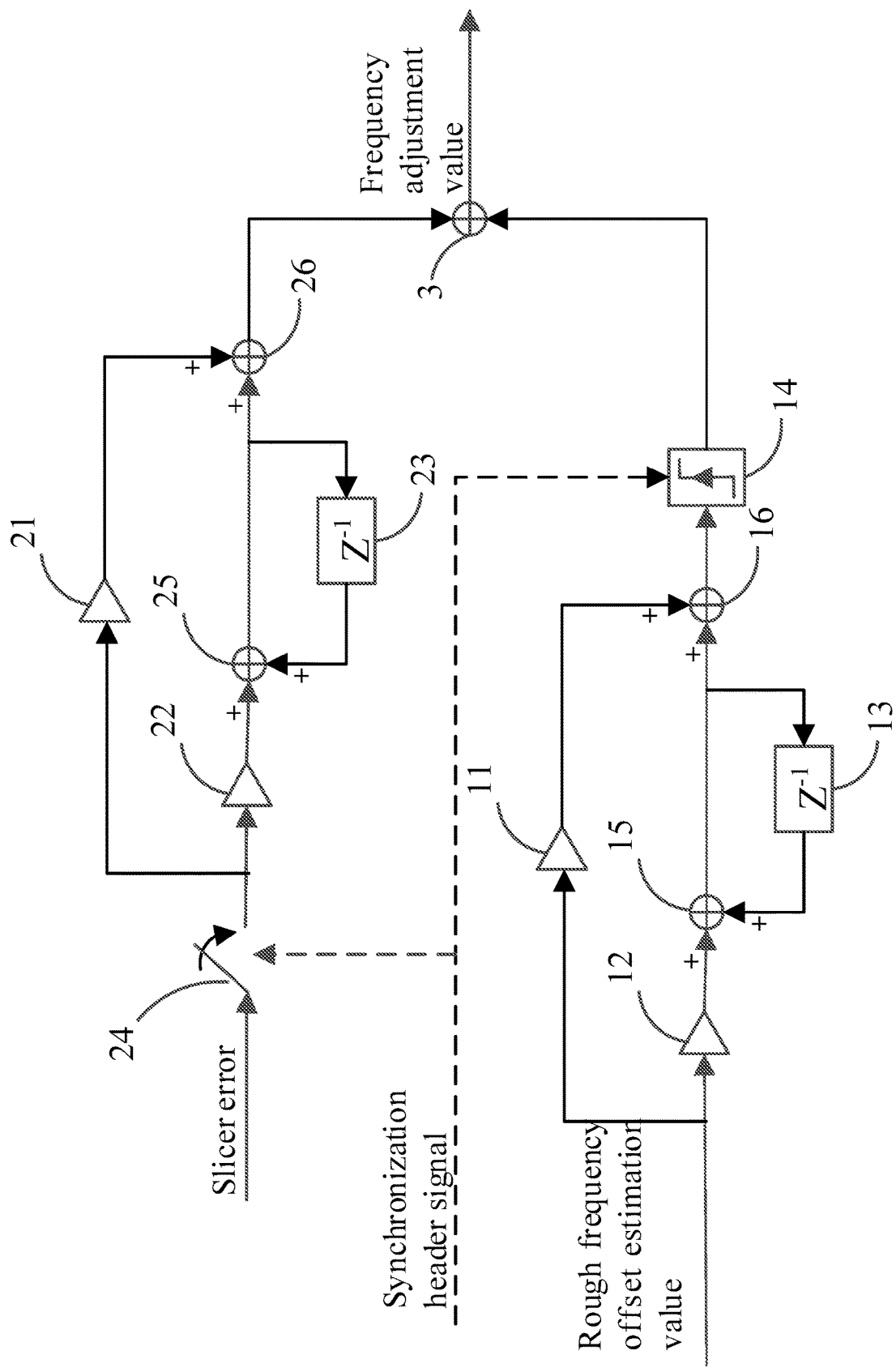
FIG. 4 is a schematic diagram of a circuit of a frequency recovery module provided by the embodiment of the present application.

A schematic diagram of a circuit of the frequency recovery module is shown in FIG. 4. The first loop filter includes a first amplification unit 11, a second amplification unit 12, a first single sampling delay unit 13, a first adder 15 and a second adder 16. An input end of the second amplification unit 12 inputs the rough frequency offset estimation value, and an output end of the second amplification unit is connected with a first input end of the first adder 15. An output end of the first adder 15 is connected with a first input end of the second adder 16 and an input end of the first single sampling delay unit 13 respectively. An output end of the first single sampling delay unit 13 is connected with a second input end of the first adder 15. An input end of the first amplification unit 11 inputs the rough frequency offset estimation value, and an output end of the first amplification unit is connected with a second input end of the second adder 16. An output end of the second adder 16 is connected with an input end of a fixing unit 14.

An amplification parameter of the first amplification unit 11 is $k_{p1}$, an amplification parameter of the second amplification unit 12 is $k_{i1}$, and a delayed time of the first single sampling delay unit 13 is determined by a sampling frequency of a signal at an input end of the frequency offset estimator.

The second loop filter includes a third amplification unit 21, a fourth amplification unit 22, a second single sampling delay unit 23, a third adder 25 and a fourth adder 26. An input end of the fourth amplification unit 22 is connected with a switch 24, and an output end of the fourth amplification unit is connected with a first input end of the third adder 25. An output end of the third adder 25 is connected with a first input end of the fourth adder 26 and an input end of the second single sampling delay unit 23 respectively. An output end of the second single sampling delay unit 23 is connected with a second input end of the third adder 25. An input end of the third amplification unit 21 is connected with the switch 24, and an output end of the third amplification unit is connected with a second input end of the fourth adder 26. An output end of the fourth adder 26 is connected with a first input end of a fifth adder 3.

An amplification parameter of the third amplification unit 21 is $k_{p2}$, an amplification parameter of the fourth amplification unit 22 is $k_{i2}$, and a delayed time of the second single sampling delay unit 23 is determined by a sampling frequency of a signal at an input end of the frequency shift keying demodulator.

An output end of the fixing unit 14 is connected with a second input end of the fifth adder 3, and an output end of the fifth adder 3 outputs the frequency adjustment value.

At an initial stage of communication, the switch 24 is in a switch-on state, and an output value of the first loop filter is transmitted to the fifth adder 3 through the fixing unit 14. When the synchronization header detector detects a preset preamble field or start-of-frame delimiter, the fixing unit 14 fixes a current input value, the switch 24 is switched off, and the second loop filter is started. The fifth adder 3 combines an output value of the second loop filter with the output value of the first loop filter kept fixed by the fixing unit 14 and outputs the combined value.

Figure 1:
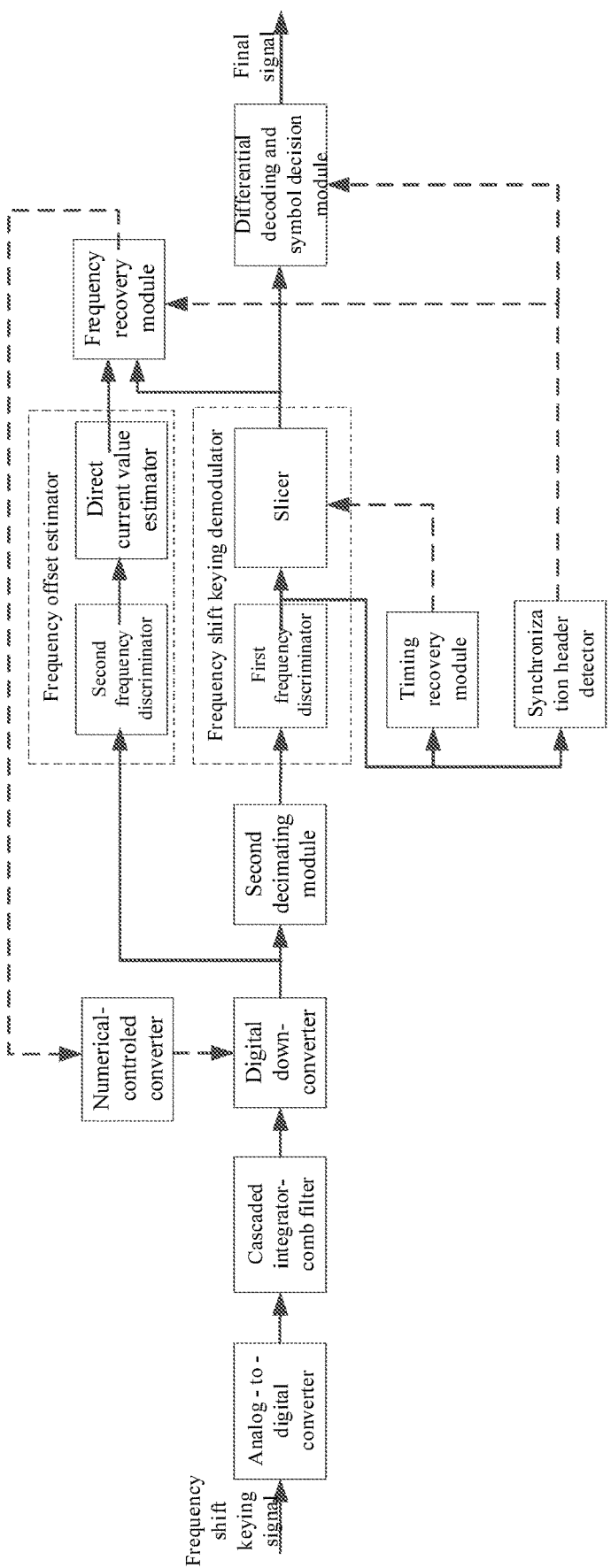
FIG. 1 is a schematic diagram of a circuit for compensating frequency offset in wireless frequency shift keying communication provided by an embodiment of the present application.

In the first embodiment, as shown in FIG. 1, the frequency offset estimator includes a second frequency discriminator and a direct current value estimator, and an input of the second frequency discriminator is the complex baseband signal or the signal outputted by the decimation filter before the last decimation filter of the second decimating module. The second frequency discriminator is connected with the direct current value estimator. The direct current value estimator outputs the rough frequency offset estimation value and is connected with the frequency recovery module.

In the first embodiment, as shown in FIG. 1, the frequency shift keying demodulator includes a first frequency discriminator and a slicer, and the first frequency discriminator is respectively connected with the second decimating module and the slicer. The slicer sample-and-holds an output of the first frequency discriminator and outputs a slicer error, and the slicer is respectively connected with the frequency recovery module and the differential decoding and symbol decision module. In the embodiment, the slicer performs Sample and Hold (S/H) on the output of the first frequency discriminator to facilitate the differential decoding and symbol decision module to make symbol decision and generate a corresponding slicer error.

Figure 2:
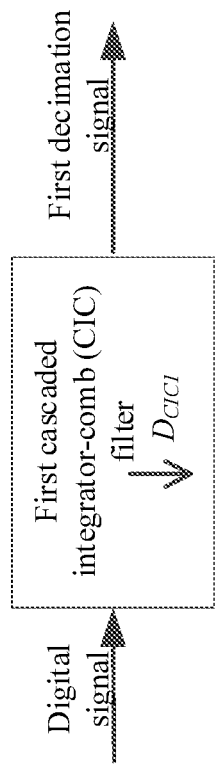
FIG. 2 is a schematic structural diagram of a first decimating module provided by the embodiment of the present application.

In the first embodiment, as shown in FIG. 2, the first decimating module is a first cascaded integrator-comb filter, with a decimation factor of $D_{CIC1}$, and $D_{CIC1} \in \{4, 5, \ldots, 16\}$.

Figure 3:
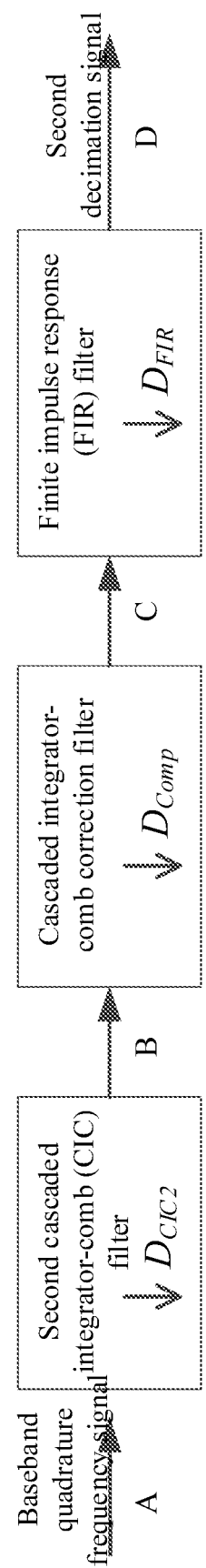
FIG. 3 is a schematic structural diagram of a second decimating module provided by the embodiment of the present application.

In the first embodiment, as shown in FIG. 3, the second decimating module includes a second cascaded integrator-comb filter, a cascaded integrator-comb compensation filter and a finite impulse response filter, and the second cascaded integrator-comb filter, the cascaded integrator-comb compensation filter and the finite impulse response filter are connected in sequence. The second cascaded integrator-comb filter is connected with the digital down-converter, with a decimation factor of $D_{CIC2}$. A decimation factor of the cascaded integrator-comb compensation filter is $D_{Comp}$. The finite impulse response filter is connected with the frequency shift keying demodulator, with a decimation factor of $D_{FIR}$. $D_{CIC2} \in \{2, 3, \ldots, 32\}$, $D_{Comp} \in \{1, 2\}$, and $D_{FIR} \in \{1, 2\}$.

Figure 5:
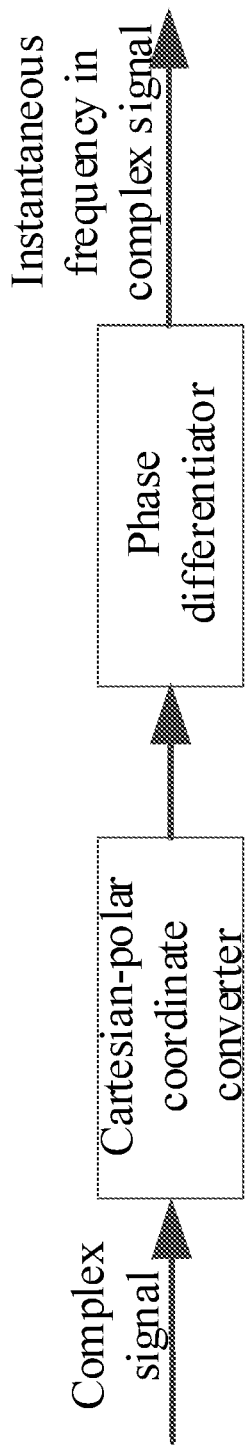
FIG. 5 is a schematic structural diagram of a frequency discriminator provided by the embodiment of the present application.

In the first embodiment, as shown in FIG. 5, the first frequency discriminator and the second frequency discriminator have a same structure and both include a Cartesian-polar coordinate converter and a phase differentiator, the Cartesian-polar coordinate converter is connected with the phase differentiator in series, and the Cartesian-polar coordinate converter calculates phase information contained in a complex signal at an input position of the phase differentiator. Then, the phase differentiator performs a differential operation on the phase information, which means to calculate a phase difference between two adjacent phase samples, and obtains an instantaneous frequency in the complex signal at the input position.

In the first embodiment, the digital down-converter in which a coordinate rotation digital computer algorithm is employed accumulates the center frequency of the reference signal generated by the numerical-control oscillator plus the frequency adjustment value sent from the frequency recovery module for a period of time to obtain a corresponding angle value, and rotates the first decimated signal at an input port of the digital down-converter by the angle.

In the first embodiment, the loop parameters ($k_{p1}$, $k_{i1}$) of the first loop filter and the loop parameters ($k_{p2}$, $k_{i2}$) of the second loop filter are capable of being configured according to a frequency offset compensation convergence speed during the frequency offset compensation process, thus adjusting a bandwidth of the loop filter.

A second embodiment of the present application discloses a method for compensating frequency offset in wireless frequency shift keying communication, which includes receiving a frequency shift keying signal and converting the same into a digital signal; filtering and decimating the digital signal to obtain a first decimated signal; combining the first decimated signal with an output signal of a numerical-control oscillator, and converting the signal into a complex baseband signal; filtering and decimating the complex baseband signal to obtain a second decimated signal; wherein a second decimating module is formed by cascading more than one decimation filter; processing the complex baseband signal or a signal outputted by a decimation filter before the last decimation filter of the second decimating module at a rate higher than a sampling rate outputted by the second decimating module to obtain a rough frequency offset estimation value; demodulating the second decimated signal to obtain a first demodulated signal, and generating, by a corresponding slicer, a slicer error corresponding to the first demodulated signal; according to the rough frequency offset estimation value, the slicer error and a synchronization header, obtaining a frequency adjustment value for compensating frequency offset in a received signal; at an initial stage of receiving the received signal, based on the rough frequency offset estimation value, correcting the frequency offset in the received signal, and when the synchronization header is detected, keeping a frequency offset estimator fixed; and thereafter, based on the slicer error and an output value of the frequency offset estimator kept fixed, correcting residual frequency offset in the received signal; and performing differential decoding and symbol decision on the first demodulated signal, and obtaining a final signal in combination with the synchronization header.

In the embodiment of the present application, Table 1 shows a format example of a PHY Protocol Data Unit (PPDU) defined for Low data Rate Wireless Personal Area Networks (LR-WPAN) in IEEE802.15.4g (Reference 1). This definition is applicable to the Smart Metering Utility Networks (SUN). Multi-Rate FSK (MR-FSK) is one of three Physical Layers (PHYs) specified in this standard to support the Smart Metering Utility Networks (SUN).

TABLE 1

Format example of PHY protocol data unit

| Synchronization Header SHR | | PHY Header PHR | Packet Service Data Unit PSDU |
|---|---|---|---|
| Preamble field (≥4 bytes) | Start-of-frame delimiter SFD | 2 bytes | Effective load (variable length) |

As shown in Table 1, in the IEEE802.15.4g Standard, a set of a Synchronization Header (SHR), a PHY Header (PHR) and a Packet Service Data Unit (PSDU) is regarded as a bit string with a length of n. A left bit number of the bit string is $b_0$, and a right bit number of the bit string is $b_{n-1}$. During transmission, $b_0$ is processed first until $b_{n-1}$ is finally processed, regardless of their contents or structures.

A digital preamble field usually consists of alternating logical "1" bit and logical "0" bit. In order to help the receiver train the system to obtain optimum signal reception, the IEEE802.15.4g Standard is a Binary FSK (2FSK) modulation solution applied in the Smart Metering Utility Networks (SUN), which defines a synchronization header containing a preamble field of 8-bit sequence "01010101" repeated for many times (referring to Reference 1).

According to the IEEE802.15.4g Standard, symbols modulated by filtered 2-FSK are coded as shown in Table 2, wherein $f_{dev}$ represents frequency deviation relative to a radio carrier frequency in a modulated signal.

TABLE 2

Symbol coding of filtered 2-FSK

| Symbol | Frequency deviation |
|---|---|
| 0 | $-f_{dev}$ |
| 1 | $+f_{dev}$ |

Exemplified frequency shift keying modulation and its derivative modulation include Continuous Phase FSK (CPFSK), Minimum Shift Keying (MSK), Gaussian Filtered MSK (GMSK), Gaussian Filtered FSK (GFSK) mechanism, or the like, and a modulated signal s(t) may be described by formula (1). The formula (1) describes a phase modulator, and a center frequency of modulation is $f_c$.

$$s(t) = \sqrt{\frac{2E_s}{T_s}} \cos(2\pi f_c t + \theta(t) + \theta_0). \quad (1)$$

$E_s$ represents energy of each symbol.
$T_s$ represents a symbol period.
$f_c$ represents a center frequency of a modulated signal.
$\theta(t)$ represents a carrier modulation phase.
$\theta_0$ represents a random constant phase.

Modulation of the Continuous Phase FSK (CPFSK) may be realized by using a signal sequence integrator in the transmitter, as shown in formula (2).

$$\theta(t) = \frac{\pi h}{T_s} \int_{-\infty}^{t} \sum_{i=0}^{N_b} a_i g(\tau - iT_s) d\tau. \quad (2)$$

$N_b$ represents a total number of original bits (including a preamble) carried in a data packet.

h represents a modulation index. The larger the value of the modulation index is, the wider the bandwidth occupied by the carrier is. Common modulation such as Minimum Shift Keying (MSK) has a modulation index of h=0.5.

$a_i$ represents an $i^{th}$ bit of a digital sequence, with a numerical value of $\in\{-1,1\}$. According to the definition in IEEE802.15.4g, if the $i^{th}$ bit is "1", then $a_i$ is mapped as "+1", and if the bit is "0", then $a_i$ is mapped as "−1".

g(t) represents a frequency pulse.

Modulation without Gaussian filter is common Frequency Shift Keying (FSK) modulation, and the frequency pulse g(t) will be rectangular.

$$g(t) = g_{rect}(t) = \begin{cases} \frac{1}{T_s}, & |t| \le \frac{T_s}{2} \\ 0, & \text{otherwise} \end{cases} \quad (3)$$

Therefore, according to a symbol value of $a_i$, phase contribution of a symbol will be "hπ" or "−hπ". This means that an instantaneous frequency of a frequency shift keying signal is $f_c-h/(2T_s)$ or $f_c+h/(2T_s)$ in a transmission signal.

If the Gaussian filter is applied to smooth the shape of the frequency pulse, and the Gaussian filter may be represented as follows.

$$g_G(t) = \frac{1}{\sqrt{2\pi} \cdot \sigma} \cdot e^{-\frac{t^2}{2\sigma^2}}. \quad (4)$$

A parameter σ is related to a 3-dB bandwidth B of the filter.

$$\sigma = \frac{\sqrt{\ln 2}}{2\pi B}. \quad (5)$$

It should be noted that a pulse response range of the Gaussian filter is −∞ to ∞. For practical implementation, a span is often limited to a certain range, for example, the span is limited to 4 to 6 symbol periods.

The shape of the frequency pulse smoothed by the Gaussian filter is changed into:

$$g(t) = g_G(t) * g_{rect}(t). \quad (6)$$

"*" represents a convolution operation.

At this moment, signal modulation is called Gaussian Filtered Frequency Shift Keying (GFSK) modulation.

A general formula for calculating a frequency shift keying modulation index is as follows.

$$h = \frac{2 \times \text{(outer) signal frequency offset}}{\text{symbol rate} \times (M - 1)}. \quad (7)$$

M is a number of modulation alphabets, for example, for the modulation of Binary Frequency Shift Keying or Gaussian Filtered Frequency Shift Keying (2FSK/2GFSK), a value of M is 2; and for the modulation of Quaternary FSK or Gaussian Filtered Frequency Shift Keying (4FSK/4GFSK), the value of M is 4. The (outer) signal frequency refers to signal frequency deviation of an outer layer in modulation above Quaternary FSK.

For the modulation of the Binary Frequency Shift Keying or Gaussian Filtered Frequency Shift Keying (2FSK/2GFSK), a symbol rate is equal to a data rate. Unlike the modulation of the Quaternary Frequency Shift Keying or Gaussian Filtered Frequency Shift Keying (4FSK/4GFSK), the modulation of the Binary Frequency Shift Keying has only one frequency deviation. In this way, a modulation index calculation formula may be simplified into the following form.

$$h = \frac{2 \times \text{signal frequency offset}}{\text{symbol rate}}. \quad (8)$$

In a wireless communication example based on the modulation of the Binary Frequency Shift Keying (2FSK) in the embodiment of the present application, according to an application specification of the Smart Metering Utility Networks (SUN) defined in Reference 1. As shown in Table 2, a frequency shift keying signal has an increased or positive frequency relative to a carrier signal of "1" bit and a decreased or negative frequency relative to a carrier signal of "0" bit. It should be noted that in some other alternative examples, mapping may be reversed, so that the "0" bit corresponds to the positive frequency and the "1" bit corresponds to the negative frequency, which does not affect basic requirements of the embodiment of the present application.

During frequency shift keying communication, a preamble symbol sequence of a limited length is transmitted to the receiver. For example, the preamble field contains a repeated "01010101" sequence pattern capable of being used to perform frequency offset estimation, and these bits will be mapped to the frequency shift keying symbols during communication as defined in Table 2.

An exemplified corresponding frequency shift keying signal receiver is shown in FIG. 1 in a simplified mode. The demonstrated frequency shift keying signal receiver runs asynchronously. A received Radio Frequency (RF) signal $r_{RF}(t)$ is subjected to frequency conversion by a mixer in a radio frequency module portion (not shown in the drawings) to generate a simple intermediate frequency signal or an intermediate frequency quadrature (complex) signal $r_{IF}(t)$. These intermediate frequency signals are filtered by a filter (not shown in the drawings) before being converted into digital signals by an Analog-to-Digital Converter (ADC).

In FIG. 1, a simple first Cascaded Integrator-Comb (CIC) filter performs first stage filtering and decimation, which is a part of design. For example, when a decimation factor $D_{CIC1}$ (referring to FIG. 2) of the filter is set to be 8, the first Cascaded Integrator-Comb filter converts a digital signal sample sequence $\{r_{ADC}(n)\}$ at an output port of the analog-to-digital converter from an original sampling rate of 32 Msps to a sampling rate of 4 Msps. In order to meet multi-standard specifications and support multiple data rates, the decimation factor $D_{CIC1}$ of the first cascaded integrator-comb filter may be configured by software, with a change range of $\{4, 5, \ldots, 16\}$.

It should be noted that in order to further reduce power consumption of some Internet of Things (IoT) applications, the analog-to-digital converter may also be configured to run at a sampling speed of 16 Msps when necessary. If the decimation factor $D_{CIC1}$ is set to be the same 8 compared with the previous example, a sampling rate of a digital signal sample at an output port of the first cascaded integrator-comb filter will be correspondingly reduced to 2 Msps, and subsequent high-power digital signal processing or numerical operation in the receiver can be reduced by half.

In FIG. 1, the Digital Down-Converter (DDC) sometimes is also called a frequency shifter, which converts a digitized band-limited intermediate signal into a baseband quadrature (i.e., complex) frequency signal to simplify a subsequent signal processing stage. All information in an original signal is reserved in a down-conversion process. A digital down-conversion circuit, for example, may be realized by using a design based on a Coordinate Rotation Digital Computer (CORDIC) algorithm, which accumulates a preset reference digital Intermediate Frequency (IF) plus a frequency adjustment value sent from a frequency recovery block for a period of time to obtain a corresponding angle value, and rotates a (complex) signal sample at an input port of the digital down-conversion circuit by the angle. The preset reference digital intermediate frequency is a center frequency of the reference signal generated by the numerical-control oscillator.

In a demonstration example in FIG. 1, the second decimating module after the Digital Down-Converter is composed of a second Cascaded Integrator-Comb (CIC) filter, a Cascaded Integrator-Comb Compensation filter and a Finite Impulse Response (FIR) filter connected in series, as shown in FIG. 3. Based on an expected data rate and a conversion rate or a sampling rate of the Analog-to-Digital Converter (ADC), these decimation filters may be configured with corresponding decimation factors to perform second-stage signal filtering and decimation.

In order to ensure high-sensitivity data reception, the second decimating module should be configured as a filter whose frequency response is matched a frequency spectrum of an input signal of the second decimating module. This means that a bandwidth of the second decimating module is equivalent to a bandwidth of the input signal of the second decimating module, thus maximizing a Signal-to-Noise Ratio (SNR) at an output end of the second decimating module. However, in practice, the bandwidth of the second decimating module may be conservatively configured to be a little larger than a bandwidth of a best matched filter to allow frequency offset in the input signal of the second decimating module, as described below.

In order to reduce a complexity of the system in digital numerical operation, a user may try to reduce a sampling rate of a digital demodulator before the signal sample reaches the digital demodulator. Configurable factors shown in FIG. 1 include the sampling rate of the Analog-to-Digital Converter (ADC), $D_{CIC1}$, $D_{CIC2}$, $D_{Comp}$ and $D_FIR$, which jointly determine the sampling rate inputted by the demodulator (i.e., the output of the second decimating module in FIG. 1), and are all user-programmable. For example, the signal sample runs at about a rate of 4 Msps at the output port of the first Cascaded Integrator-Comb (CIC) filter, while a rate of the signal sample at the output port of the second decimating module may vary from 20 Ksps to 500 Ksps, which depends on values configured for these decimation factors in the decimation filters. According to the sampling rate of the Analog-to-Digital Converter (ADC) and the required data rate, it is necessary to properly evaluate configuration of all decimation factors in the first Cascaded Integrator-Comb (CIC) filter and the second decimating module.

In the following example, it is assumed that a binary frequency shift keying symbol rate is 10 kbps, and the sampling rate outputted by the second decimating module is selected to be four times the frequency shift keying symbol rate, which is called quadruple Over-Sampling Ratio (OSR=4) at the output port of the second decimating module. The signal sample outputted by the second decimating module is ready for frequency discrimination or other types of digital demodulation.

The frequency shift keying demodulator shown in FIG. 1, as an example, is designed based on incoherent frequency discrimination—a signal phase is calculated by a signal through a Cartesion-to-polar converter, and then a phase differentiator is provided. The frequency shift keying demodulator and the phase differentiator are connected in series to serve as the frequency discriminator to evaluate an instantaneous frequency in a signal sample at an input port of the frequency discriminator (referring to FIG. 5).

It should be noted that those skilled in the art may use a well-known frequency shift keying signal demodulation circuit other than this example design instead of this digital demodulation design.

It should be noted that in the wireless communication system, a transmitter node and a corresponding receiver node are required to run on a same radio frequency channel to communicate with each other. When center frequencies of radio frequency channels are deviated from each other, the probability of bit determination fault in communication may be increased with the frequency offset, and even the communication may fail. For example, in some practical application scenes, crystals in transmitter and receiver nodes are slightly different, which may lead to frequency offset in the received signal. In many cases, it is necessary to apply a frequency correction method in the receiver to correct frequency offset. For example, the receiver should contain a component for estimating frequency offset and correspondingly compensating and correcting the frequency offset.

Due to the repeated "0/1" bit pattern in the preamble field, an output sample series $\{y_{fd}(n)\}$ of the frequency discriminator will be alternated between a positive value and a negative value corresponding to a switch between the positive frequency and the negative frequency in the received signal. Since the digital preamble field is composed of the repeated 8-bit sequence "01010101", which means that there are the same number of "1" and "0" in the sequence, for the digital preamble field which is an integer multiple of the 8-bit sequence, a sum of $\{y_{fd}(n)\}$ outputted by the frequency discriminator should ideally be equal to "0".

Relative to a signal transmitting station, if there is fixed but unknown carrier frequency offset $\Delta f$ in the received signal, a constant phase rotation component $2\pi\Delta fT_d$ will be contained between adjacent samples outputted by the frequency discriminator, wherein $T_d$ is a sampling period at an input position of the frequency discriminator shown in FIG. 1. For example, in such wireless frequency shift keying communication system, 5 ppm frequency offset of a radio frequency signal with a center frequency of 928 MHz will lead to an approximate signal frequency offset $\Delta f$=4.64 kHz in the received signal. Moreover, a sampling rate 40 ksps at an input position of the demodulator input means $T_d$=25 µs. Therefore, the frequency offset in the received signal may lead to additional phase rotation of 41.76 degrees, thus leading to existence of a non-zero phase mean value between adjacent samples in the output sample of the frequency discriminator during the preamble period, which is namely phase offset. The additional phase offset is closely related to frequency offset, so that the additional phase offset may be used to estimate the frequency offset. Actually, frequency offset and phase offset have a nearly linear relationship. In many examples, the sample sequences $\{y_{fd}(n)\}$ outputted by the frequency discriminator may be averaged on multiple repeated preambles, which makes averaged phase offset estimation $\hat{\varnothing}_m(n)$ more reliable, and may be used for more reliable frequency offset estimation. Mathematically, an average phase offset estimation value $\hat{\varnothing}_m(n)$ may be calculated by formula (9) as follows.

$$\hat{\varnothing}_m(n) = \frac{1}{N} \sum_{k=n-N+1}^{n} y_{fd}(k). \tag{9}$$

$\{y_{fd}(k)\}$ represents a sample value sequence outputted by the discriminator, and N represents a number of current and previous sampling times.

Due to an environmental noise in a signal sample, the average phase offset estimation value may be changed with time. In practice, the average value operation in the formula (9) may be realized by using a direct current value estimator.

A frequency offset estimation value $\Delta \hat{f}(n)$ may be obtained by multiplying a constant $K_f$ by average phase offset $\hat{\varnothing}_m(n)$, as shown in formula (10).

$$\Delta \hat{f}(n) = K_f \cdot \hat{\varnothing}_m(n). \tag{10}$$

The constant $K_f$ depends on the sampling rate outputted by the demodulator, and may be determined by theoretical evaluation or off-line numerical simulation.

Since a non-zero direct current value at an output port of the demodulator caused by frequency offset may also be propagated to an output port of the slicer, in some other examples of the frequency shift keying receiver or in the prior art, frequency offset information in the received signal is obtained through the slicer and associated slier error information.

After obtaining the frequency offset estimation in the received signal, as shown in FIG. 1, carrier frequency offset may be corrected by directly or adaptively adjusting (i.e., finely adjusting) a digital intermediate frequency component or a radio frequency synthesizer through the frequency recovery module and the Numerical-Controlled Oscillator (NCO). In the communication system based on frequency shift keying modulation, when there is an input signal at the input end of the receiver, automatic frequency recovery is usually enabled.

In the application of the Smart Metering Utility Networks (SUN), in order to improve the sensitivity of the receiver in long-distance communication between the transmitter and the corresponding receiver, in the communication system based on frequency shift keying, the user may prefer to use low data rate communication, such as about 10 kilobits per second (10 kbps). In addition, in many cases, the user may expect the frequency shift keying system to run with a high system spectrum efficiency, in other words, Frequency Deviation $f_{d}e$, of a signal in frequency shift keying modulation is kept close to or even smaller than a data rate $D_{bps}$. For example, in a well-known Minimum Shift Keying (MSK) or Gaussian Filtered MSK (GMSK) modulation solution, a modulation index h is ½ for consideration of a system spectrum efficiency. In this solution, $f_{dev}/D_{bps}=¼$.

In the following description, it is once again assumed that a symbol rate $D_{bps}$ is 10 kbps, and the modulation index h is set to be 1.0, which is typical modulation index setting for frequency shift keying modulation, and means $f_{dev}/D_{bps}=1/2$. According to requirements of a Nyquist rate sampling theorem, a sampling rate of a baseband signal outputted by the second decimating module should be at least 2 times larger than a maximum frequency component in the signal, and under an ideal condition of perfect frequency synchronization (i.e., Δf=0), $f_{s,D} \geq 2 \cdot f_{dev}$. Actually, when there is frequency offset Δf in the received signal outputted by the second decimating module, the following constraint is set for the Nyquist theorem.

$$f_{s,D} \geq 2 \cdot |\Delta f \pm f_{dev}|.$$

When the sampling rate outputted by the second decimating module is selected to be four times the symbol rate to maintain the high sensitivity of the receiver in data demodulation, in other words, the sample rate at the output port of the second decimating module is a quadruple over-sampling ratio, and $f_{s,D}=4 \cdot D_{bps}$, this constraint means that in the conventional frequency shift keying receiver example, maximum frequency offset Δf allowed in the received signal is limited to be $|\Delta f| \leq f_{dev}$, that is, in this embodiment, the allowed frequency offset is limited to (about) 10 kHz. If the radio frequency signal channel of the frequency shift keying communication system is located near 928 MHz, the frequency offset limit represents that a frequency accuracy of a reference signal provided by a crystal oscillator of the transmitter and the receiver for radio frequency and system clock generation must be within ±5.39 ppm. An expensive crystal oscillator with very high accuracy and high stability may become a necessary condition for this conventional frequency shift keying modulation system. In addition, this ±5.39 ppm system tolerance requirement is far lower than a transmission center frequency tolerance and a symbol tolerance specified in a physical layer specification in Reference 1 for the Smart Metering Utility Networks (SUN), which means that "the maximum transmission center frequency tolerance should be ±20 ppm. When communicating with a traditional device, the receiver should be capable of receiving a signal with a center frequency offset tolerance reaching up to ±40 ppm" (referring to Reference 1).

Apparently, in a traditional wireless frequency shift keying communication system of a low data rate application, the low-cost crystal oscillator is not allowed to perform accurate filtering in baseband to obtain high-sensitivity signal reception, because when a common and low-cost crystal oscillator is used for reference frequency signal and system clock generation in the transmitter or the receiver, a frequency of the received signal is likely to be beyond the passband of the second decimating module. Under these circumstances, data in an input radio frequency signal cannot be completely extracted in frequency discrimination and demodulation stages. If the common and low-cost crystal oscillator is expected to be used with a reasonable system cost (including the transmitter and the receiver), and data demodulation can still be performed after accurate narrowband filtering to keep a high receiving sensitivity, a frequency fault in the digital intermediate frequency signal must be corrected first to perform accurate signal filtering and support the high sensitivity of the receiver in the low data rate application.

The technical challenges often encountered by such frequency shift keying or similar modulated signals in low data rate applications such as Smart Metering Utility Networks (SUN), in fact, may be solved in a simple and innovative way in terms of system complexity and easy hardware implementation.

As shown in FIG. 3, it should be noted that a sampling rate $f_{s,C}$ at a node C is higher than a sampling rate $f_{s,D}$ at a decimating output position by $D_{FIR}$ times. Similarly, a sampling rate $f_{s,B}$ at a node B is higher than $f_{s,B}$ by $D_{Comp}$ times. A sampling rate $f_{s,A}$ at a node A is higher than $f_{s,B}$ by $D_{CIC2}$ times. The sampling rates are expressed by formula (11) as follows.

$$f_{s,C} = D_{FIR} \cdot f_{s,D} \qquad (11)$$
$$f_{s,B} = D_{Comp} \cdot D_{FIR} \cdot f_{s,D}$$
$$f_{s,A} = D_{CIC2} \cdot D_{Comp} \cdot D_{FIR} \cdot f_{s,D}.$$

$f_{s,D}$ represents the sampling rate at the output port of the second decimating module. When $f_{s,D}$ is set to be four times the symbol rate $D_{bps}$ again, $f_{s,D}=4 \cdot D_{bps}$.

As an example, for a $D_{bps}=10$ kbps data rate application, the decimation factor in the second decimating module is configured as follows: $D_{CIC2}=25$, $D_{Comp}=2$, and $D_{FIR}=2$, and it is assumed that the sampling rate of the Analog-to-Digital Converter (ADC) is 32 MHz, and the decimation factor $D_{CIC1}$ of the first Cascaded Integrator-Comb (CIC) filter is set to be 8.

Based on the above reasoning and the constraint of the same Nyquist sampling theorem, $$f_{s,A} \geq 2 \cdot |\Delta f \pm f_{dev}|.$$

Therefore, $$f_{s,A} = D_{FIR} \cdot D_{Comp} \cdot D_{CIC2} \cdot f_{s,D} = 100 \cdot f_{s,D} \geq 2 \cdot |\Delta f \pm f_{dev}|.$$

In other words, when frequency discrimination is performed at the node A shown in FIG. 3, the allowed maximum frequency offset Δf is obviously amplified to be $|\Delta f| \leq 99 \cdot f_{dev}$.

Based on the observation and the above reasoning, in the embodiment of the present application, an additional frequency offset estimator is added in a traditional frequency shift keying receiver, with an input signal introduced from a node branch in a received signal path, for example, as for the node A shown in FIG. 3, the sampling rate of the selected node should be higher or much higher than the sampling rate outputted by the second decimating module and the sampling rate inputted by the frequency shift keying demodulator. Frequency offset information in the received signal is extracted before the second decimating module, which greatly increases the frequency offset acquisition range. In case of large frequency offset, the received signal will still exist in a signal path before the last filter of the second decimating module. In the embodiment of the present application, this fact is utilized, and a relatively simple circuit is added to support large frequency offset correction in low data rate frequency shift keying communication. Meanwhile, since accurate filtering may be performed in the second decimating module, the high receiving sensitivity of the communication system is kept, as shown in FIG. 1 and FIG. 3.

In addition to the frequency offset estimator, in the embodiment of the present application, a loop filter (referring to FIG. 4) related to the frequency offset estimator is also introduced in the frequency recovery module, with an output used to adjust the center frequency of the Numerical-Controlled Oscillator (NCO) (referring to FIG. 1) to reduce frequency offset of the received signal.

It should be emphasized that in the present application, a frequency control program (as shown in FIG. 1) may be adaptively performed.

In step 1, in an initial stage of communication, when the received signal appears and is detected by the receiver, rough frequency offset estimation and correction are performed during a preamble symbol period. The frequency adjustment value is generated by the frequency recovery module, so that the rough frequency offset estimation value processed by the first loop filter is used for frequency correction (referring to FIG. 4). If loop filter parameters ($k_{p1}$, $k_{i1}$) in the first loop filter are configured correctly, rough frequency offset may be corrected within a reasonable time limit during the preamble symbol period.

In step 2, when frequency offset in the received signal is successfully reduced in the step 1, so that the synchronization header (including the preamble field and the Start-of-Frame Delimiter) is reliably detected by a related detector, after that, an output value of the first loop filter is kept fixed, and a fine frequency offset adjustment mechanism based on the slicer error is enabled to generate an output of a second loop filter. The output of the second loop filter is combined with the output of the first loop filter kept fixed to further reduce residual frequency offset in the received signal. If loop filter coefficients ($k_{p1}, k_{i1}, k_{p2}, k_{i2}$) are configured correctly, when the synchronization header is received, any large frequency offset in the received signal should already be reduced to the minimum.

In short, when the common and low-cost crystal oscillator is used in the frequency shift keying communication system for cost consideration, the mechanism provided by the embodiment of the present application can adaptively correct large frequency offset in the received signal, especially for low data rate applications, and maintain a high receiving sensitivity of signal reception at the same time. In the embodiment of the present application, a rough frequency offset estimator and an associated loop filter are added into a traditional wireless frequency shift keying receiver. In addition, in the frequency recovery module provided, the rough frequency offset estimation value is combined with the slicer error in a specific way to generate a control signal related to frequency offset in the received signal, and the control signal is transmitted to the numerical-control oscillator to adaptively adjust a center frequency of an oscillated signal, thus reducing the frequency offset in the received signal.

It should be noted that at the output end of the second frequency discriminator, in addition to the design of the direct current value estimator, those skilled in the art may use the known circuit capable of extracting rough frequency offset information instead of this design.

Although some examples of frequency shift keying communication have been described in detail herein, it should be understood that the concept of the present invention may be embodied and used differently in other ways, and the appended claims are intended to be interpreted as including these variations unless limited by the prior art.

The present invention provides the circuit and method for compensating frequency offset in wireless frequency shift keying communication, with many methods and ways to realize the technical solution specifically. Those described above are merely the specific embodiments of the present invention, and it should be pointed out that those of ordinary skills in the art may further make improvements and decorations without departing from the principle of the present invention, and these improvements and decorations should also be regarded as the scope of protection of the present invention. All unspecified components in the embodiments can be implemented in the prior art.

What is claimed is:

1. A circuit for compensating frequency offset in wireless frequency shift keying communication, comprising an analog-to-digital converter, a first decimator, a digital down-converter, a second decimator, a frequency offset estimator, a frequency shift keying demodulator, a timing recovery circuit, a synchronization header detector, a frequency recovery circuit, a numerical-control oscillator, and a differential decoding and symbol decision circuit, wherein, the analog-to-digital converter is configured for receiving a frequency shift keying signal and converting the same into a digital signal;

the first decimator is configured for filtering and decimating the digital signal to obtain a first decimated signal;

the digital down-converter is configured for combining the first decimated signal with an output signal of the numerical-control oscillator, and converting the signal into a complex baseband signal;

the second decimating module decimator is configured for filtering and decimating the complex baseband signal to obtain a second decimated signal; and the second decimating module decimator is formed by cascading more than one decimation filter;

the frequency offset estimator is configured for processing a signal at a rate higher than a sampling rate outputted by the second decimator to obtain a rough frequency offset estimation value, wherein the signal is the complex baseband signal or a signal outputted by a decimation filter before the last decimation filter of the second decimator;

the frequency shift keying demodulator is configured for demodulating the second decimated signal to obtain a first demodulated signal and a corresponding slicer error;

the timing recovery circuit is configured for extracting timing information from the first demodulated signal;

the synchronization header detector is configured for detecting a synchronization header from the first demodulated signal;

the frequency recovery circuit is configured for, according to the rough frequency offset estimation value, the slicer error and the synchronization header, obtaining a frequency adjustment value;

the numerical-control oscillator is configured for generating a reference signal and using the frequency adjustment value for adjusting a center frequency of the reference signal; and the differential decoding and symbol decision circuit performs differential decoding and symbol decision on the first demodulated signal, and obtains a final signal in combination with the synchronization header.

2. The circuit for compensating frequency offset in wireless frequency shift keying communication according to claim 1, wherein the frequency recovery circuit comprises a first loop filter and a second loop filter, the first loop filter is connected with the frequency offset estimator to receive the rough frequency offset estimation value; at an initial stage when the first decimated signal is received, an output of the first loop filter is configured for correcting rough frequency offset, and the output is kept to be fixed immediately after the synchronization header is detected; and loop parameters of the first loop filter are recorded as $(k_{p1}, k_{i1})$; and the second loop filter is connected with the frequency shift keying demodulator to receive the slicer error; when the synchronization header is detected, the second loop filter is enabled, and an output of the second loop filter is combined with the output of the first loop filter for correcting residual frequency offset; and loop parameters of the second loop filter are recorded as $(k_{p2}, k_{i2})$.

3. The circuit for compensating frequency offset in wireless frequency shift keying communication according to claim 2, wherein the frequency offset estimator comprises a second frequency discriminator and a direct current value estimator, and an input of the second frequency discriminator is the complex baseband signal or the signal outputted by the decimation filter before the last decimation filter of the second decimator; the second frequency discriminator is connected with the direct current value estimator; and the direct current value estimator outputs the rough frequency offset estimation value and is connected with the frequency recovery circuit.

4. The circuit for compensating frequency offset in wireless frequency shift keying communication according to claim 3, wherein the frequency shift keying demodulator comprises a first frequency discriminator and a slicer, and the first frequency discriminator is respectively connected with the second decimator and the slicer; and the slicer samples and keeps an output of the first frequency discriminator and outputs a slicer error, and the slicer is respectively connected with the frequency recovery circuit and the differential decoding and symbol decision circuit.

5. The circuit for compensating frequency offset in wireless frequency shift keying communication according to claim 4, wherein the first decimator is a first cascaded integrator-comb filter, with a decimation factor of $D_{CIC1}$, and $D_{CIC1} \in \{4,5, \ldots, 16\}$.

6. The circuit for compensating frequency offset in wireless frequency shift keying communication according to claim 5, wherein the second decimator comprises a second cascaded integrator-comb filter, a cascaded integrator-comb compensation filter and a finite impulse response filter, the second cascaded integrator-comb filter, the cascaded integrator-comb compensation filter and the finite impulse response filter are connected in sequence, the second cascaded integrator-comb filter is connected with the digital down-converter, with a decimation factor of $D_{CIC2}$; a decimation factor of the cascade integrator-comb compensation filter is $D_{Comp}$; the finite impulse response filter is connected with the frequency shift keying demodulator, with a decimation factor of $D_{FIR}$, wherein $D_{CIC2} \in \{2,3, \ldots, 32\}$, $D_{CIC2} \in \{2,3, \ldots, 32\}$, and $D_{FIR} \in \{1,2\}$.

7. The circuit for compensating frequency offset in wireless frequency shift keying communication according to claim 6, wherein the first frequency discriminator and the second frequency discriminator have a same structure and both comprise a Cartesian-polar coordinate converter and a phase differentiator, the Cartesian-polar coordinate converter is connected with the phase differentiator in series, and the Cartesian-polar coordinate converter calculates phase information contained in a complex signal at an input position of the phase differentiator; and then, the phase differentiator performs a differential operation on the phase information, which means to calculate a phase difference between two adjacent phase samples, and obtains an instantaneous frequency in the complex signal at the input position.

8. The circuit for compensating frequency offset in wireless frequency shift keying communication according to claim 7, wherein the digital down-converter, based on a coordinate rotation digital computer algorithm, accumulates the center frequency of the reference signal generated by the numerical-control oscillator plus the frequency adjustment value sent from the frequency recovery circuit for a period of time to obtain a corresponding angle value, and rotates the first decimated signal at an input port of the digital down-converter by the angle.

9. The circuit for compensating frequency offset in wireless frequency shift keying communication according to claim 8, wherein the loop parameters $(k_{p1}, k_{i1})$ of the first loop filter and the loop parameters $(k_{p2}, k_{i2})$ of the second loop filter are capable of being configured according to a frequency offset compensation convergence speed during the frequency offset compensation process, thus adjusting a bandwidth of the loop filter.

10. A method for compensating frequency offset in wireless frequency shift keying communication, comprising:

receiving a frequency shift keying signal and converting the same into a digital signal;

filtering and decimating the digital signal to obtain a first decimated signal;

combining the first decimated signal with an output signal of a numerical-control oscillator, and converting the signal into a complex baseband signal;

filtering and decimating the complex baseband signal to obtain a second decimated signal; wherein a second decimating module is formed by cascading more than one decimation filter;

processing the complex baseband signal or a signal outputted by a decimation filter before the last decimation filter of the second decimating module at a rate higher than a sampling rate outputted by the second decimating module to obtain a rough frequency offset estimation value;

demodulating the second decimated signal to obtain a first demodulated signal, and generating, by a corresponding slicer, a slicer error corresponding to the first demodulated signal;

according to the rough frequency offset estimation value, the slicer error and a synchronization header, obtaining a frequency adjustment value for compensating frequency offset in a received signal;
at an initial stage of receiving the received signal, based on the rough frequency offset estimation value, correcting the frequency offset in the received signal, and when the synchronization header is detected, keeping a frequency offset estimator fixed; and
thereafter, based on the slicer error and an output value of the frequency offset estimator kept fixed, correcting residual frequency offset in the received signal; and
performing differential decoding and symbol decision on the first demodulated signal, and obtaining a final signal in combination with the synchronization header.

* * * * *